Figure 1:
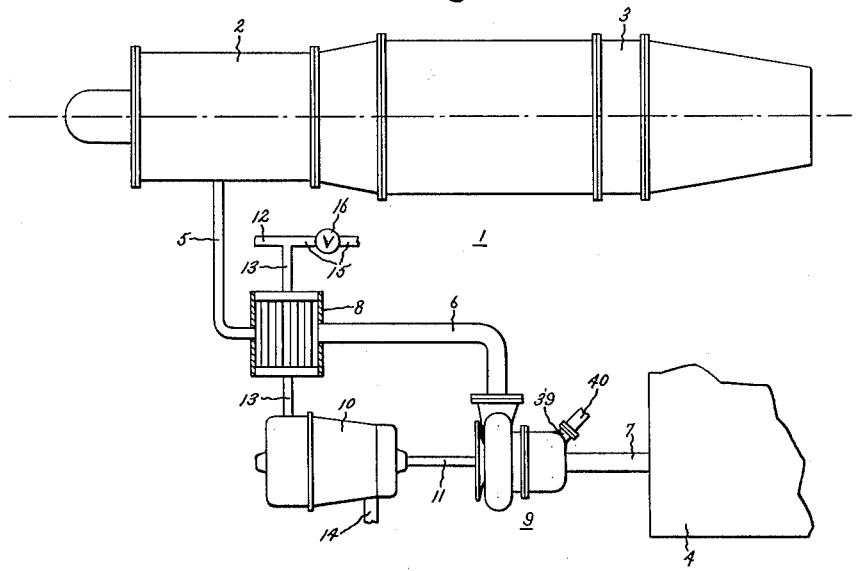

May 12, 1953　　　D. J. BLOOMBERG　　　2,637,984
TURBINE

Filed July 26, 1950　　　　　　　　　2 Sheets-Sheet 1

Inventor:
David J. Bloomberg,
by Ernest C. Britton
His Attorney.

May 12, 1953  D. J. BLOOMBERG  2,637,984
TURBINE

Filed July 26, 1950  2 Sheets-Sheet 2

Inventor:
David J. Bloomberg,
by Ernest K. Britton
His Attorney.

Patented May 12, 1953

2,637,984

UNITED STATES PATENT OFFICE 2,637,984

TURBINE

David J. Bloomberg, Newton, Mass., assignor to General Electric Company, a corporation of New York Application July 26, 1950, Serial No. 175,950

6 Claims. (Cl. 62—123)

1

This invention relates to turbomachines employed in the supercharging of the cabins of high altitude aircraft, and more particularly to an improved turbine arrangement for obtaining greater efficiency of energy conversion.

In aircraft intended for operation at high altitudes, it is necessary to provide means for pressurizing the cabins of such aircraft as well as means for controlling the temperature of the pressurized air applied to the cabin. Such an aircraft for high altitude operation may be propelled by a gas turbine type of powerplant of the type comprising a compressor and a turbine arranged in series flow relation. In such an arrangement, a source of pressurized air for cabin supercharging purposes is available and, to utilize such air, it is only necessary to provide suitable conduit means connecting the cabin of such an aircraft to the compressor of the powerplant. To completely solve the problem, however, it is also necessary to provide means for reducing the pressure of the air discharged from the compressor to a value which is suitable for cabin pressurization purposes. In addition, modern gas turbine powerplants operate at fairly high pressure ratios and high temperature ratios so that it is also necessary to provide means for reducing the temperature of the air discharged by the compressor before this air is conveyed to the cabin.

In this connection, it has been suggested to pass the air taken from the compressor through a heat exchanger, thereby removing some of the heat from the air, and then to pass this partially cooled air through a refrigeration turbine so as to remove additional heat before the air is finally conveyed to the aircraft cabin. The cooling medium for the heat exchanger may be atmospheric air which is at subzero temperatures at high altitudes and which is drawn through the heat exchanger by means of an exhauster device which also serves as a load for the refrigeration turbine.

Ordinarily, an important objective in turbine design is to obtain the utmost efficiency so as to obtain the maximum conversion of the pressure and temperature energy of the motive fluid into mechanical energy for producing power. This means that the designer not only must use the utmost care in the thermodynamic design of the turbine, but he must also devote considerable attention to the problem of preventing leakage so that the motive fluid will not leak past certain portions of the turbine structure without useful conversion of the pressure and temperature energy of the fluid into mechanical energy. The designer of a refrigeration turbine is faced with

2 entirely different problems. In the design of a refrigeration turbine, it is extremely important to arrange and to proportion the turbine parts in such a manner that the motive fluid is caused to undergo a maximum temperature change while passing from the turbine inlet to the turbine discharge passageway. Furthermore, in a refrigeration turbine, the mechanical power or energy output of the machine and the above-mentioned leakage problem are of secondary importance.

Accordingly, it is an object of the invention to provide an improved refrigeration turbine arrangement.

It is also an object of the invention to provide an improved refrigeration turbine wherein the motive fluid is caused to undergo a maximum temperature drop while passing through the turbine.

It is also an object of the invention to provide a turbine with a novel arrangement wherein the cross-sectional area of a critical portion of the turbine flow passageway can be varied.

A further object of the invention is to provide an improved refrigeration turbine arrangement wherein only the flow passing through more efficient portions of the turbine are permitted to be discharged from the turbine and the inefficient portions are thrown away.

Figure 2:
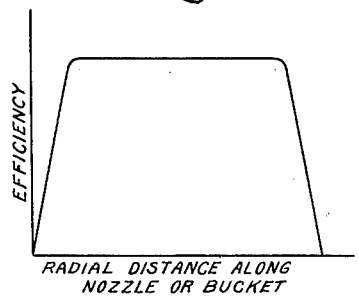
Figure 3:
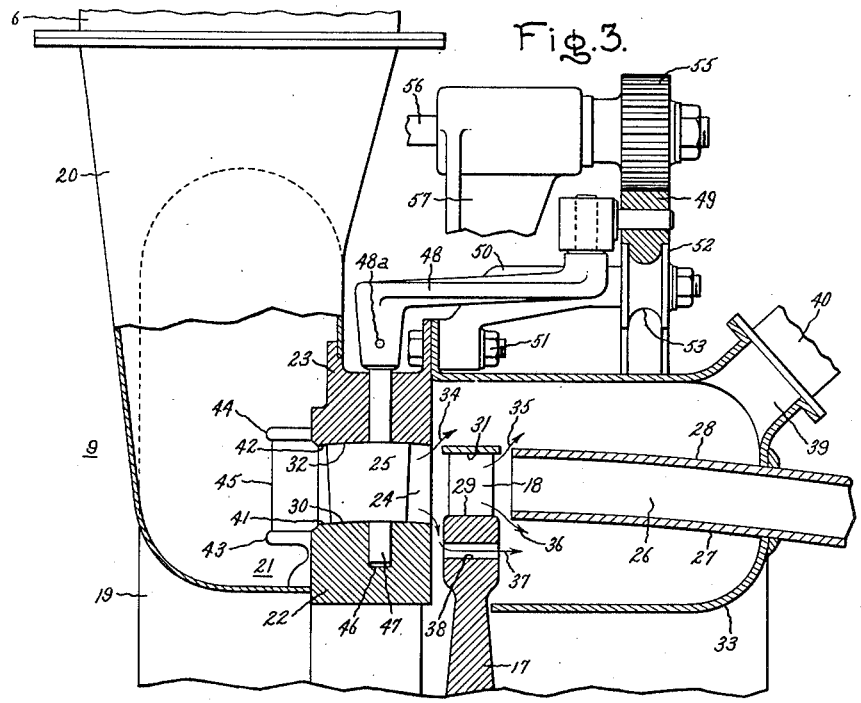
Figure 4:
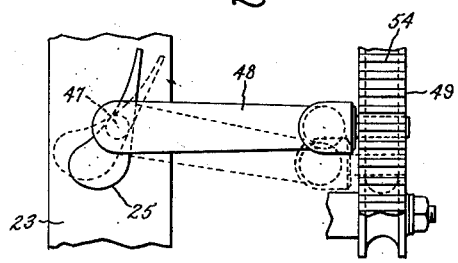
Figure 5:
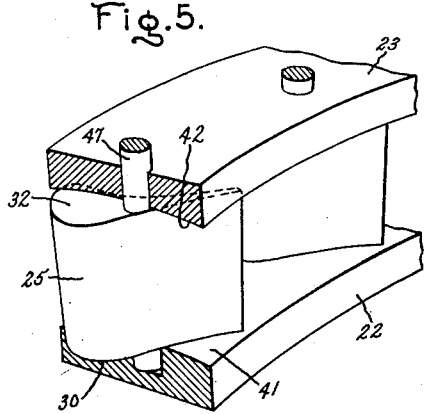

Other objects and advantages will become apparent from the following description taken in connection with the accompanying drawings, in which Fig. 1 is a diagrammatic view illustrating the gas turbine power plant together with apparatus in accordance with the invention for pressurizing and effecting temperature control of pressurized air supplied to the cabin of an aircraft; Fig. 2 is a diagram illustrating the efficiency of energy conversion at various locations along the length of a nozzle or blade of a turbomachine; Fig. 3 is a view, partly in section, showing a turbine in accordance with the invention; Fig. 4 is a fragmentary top view illustrating a portion of the operating means for the variable nozzle arrangement of Fig. 3; and Fig. 5 is a pictorial view showing two adjacent blades of the variable nozzle arrangement of Fig. 3.

Referring now to Fig. 1, a gas turbine power plant is illustrated generally at 1. Such a powerplant may comprise a compressor 2, and a turbine 3. The details of power plant 1 are not material to an understanding of the present invention and are described with greater particularity in a copending application of Alan Howard, S. N.

541,565, filed June 22, 1944, and assigned to the assignee of the present application.

In order to supply pressurized air to an aircraft cabin 4, connection is established between the cabin and the compressor 2 of powerplant 1 by the provision of conduit portions 5, 6, 7, heat exchanger 8, and a refrigeration turbine indicated generally at 9, all connected in series flow relation as indicated in the drawing. Conduit portion 5 is connected to compressor 2 at any convenient location where there is sufficient pressure to furnish the desired degree of cabin pressurization. It will be apparent to those skilled in the art that the temperature of the air delivered by the compressor to conduit portion 5 may be too high for cabin pressurization purposes because of the heat added to the air by the compression process. Heat exchanger 8 is, therefore, provided to remove a portion of this heat and to reduce the temperature of the air supplied thereto by compressor 2 to as low a value as possible before the air is conveyed to refrigeration turbine 9 by conduit 6. After leaving heat exchanger 8, the air passes through refrigeration turbine 9 where the pressure of the air is reduced and its temperature is further reduced before being discharged into cabin 4.

A pumping device or exhauster 10 is connected to turbine 9 by a shaft 11 so that the mechanical power developed by the turbine is utilized for driving the exhauster. Exhauster 10 performs the function of causing a cooling medium to be circulated through conduit portions 12, 13 and heat exchanger 8 in order to reduce the temperature of the cooling medium conveyed through conduit portions 5, 6 and heat exchanger 8 before it is conveyed to turbine 9. As illustrated in the drawing, atmospheric air is drawn into the conduit portion 12 by exhauster 10 and is discharged therefrom to the atmosphere by a conduit portion 14. In order to provide control over the amount of temperature reduction effected by heat exchanger 8, a branch conduit portion 15 having a valve 16 therein is provided for by-passing variable portions of the cooling medium that enters conduit portion 12 before it reaches heat exchanger 8.

The system described to this point is well-known, and the present invention lies in the provision of a novel and improved structural arrangement of turbine 9.

Fig. 3 shows a portion of turbine 9 which comprises a rotor 17 carrying a plurality of buckets 18, a nozzle box 19, having an inlet portion 20 connected to conduit portion 6, and a nozzle diaphragm indicated generally at 21. The nozzle box 19 receives motive fluid under pressure from conduit portion 6, and then supplies the fluid uniformly to nozzle diaphragm 21.

Nozzle diaphragm 21 comprises inner and outer annular members 22, 23, respectively, defining an annular flow passageway 24. A plurality of guide vanes 25 extend generally in a radial direction between inner and outer members 22, 23, and are supported thereby. While passing through passageway 24, the pressure energy of the motive fluid is converted into kinetic or velocity energy and the fluid is discharged therefrom at high velocity against turbine buckets 18, thereby causing rotation of rotor 17 which is connected to shaft 11 (Fig. 1). After passing through the turbine buckets, the motive fluid is discharged therefrom into an annular exhaust passageway 26 formed by coaxial inner and outer walls 27, 28, respectively.

Referring now to Figs. 2, 3, experiments have shown that there is an inefficient conversion of energy by the nozzle or blade portions of a turbomachine at regions immediately adjacent to the root and tip sections of the nozzles or blades, whereas the conversion of energy by the nozzle or blade portions of a turbomachine between the two above mentioned regions is quite efficient and quite uniform. This is illustrated diagrammatically in Fig. 2. Since these inefficient portions of the flow path of a turbo machine can only serve to increase the temperature of the fluid discharged from such nozzles or blades, in a refrigeration turbine, it is desirable to use only the efficient portion of the turbine flow and to discard the inefficient portions of the flow in order to obtain the lowest possible temperature of the motive fluid discharged therefrom. This is accomplished in accordance with one feature of the invention by the provision of turbine buckets 18 having a height and a radial direction substantially less than the radial height of the turbine nozzle passageway 24, or, in negative overlap relation. In other words, the roots 29 of the turbine buckets 18 are at a greater radial distance from the axis of the machine than the corresponding radial distance of the roots 30 of nozzle blades 25, and the tips 31 of the turbine buckets are at a smaller radial distance from the axis of the machine than the corresponding radial distance of the tips 32 of the nozzle blades 25. It will be obvious to those skilled in the art that such an arrangement provides a flow path through buckets 18 of substantially smaller cross-sectional area than the cross-sectional area of passageway 24 so that a portion of the motive fluid discharged from nozzle passageway 24 can not pass through the portion of the turbine flow path defined by turbine buckets 18. This portion of the motive fluid that is not permitted to pass through the flow path defined by buckets 18 is disposed of in a manner which will become apparent as the description proceeds.

In a like manner, the inner surface of the end portion of wall 27 adjacent to and at the downstream side of turbine buckets 18 is also arranged in negative overlap relation. That is, said end portion is located at a greater radial distance from the axis of the machine than the corresponding radial distance of roots 29 of the buckets, and the inner surface of the corresponding end portion of wall 28 is located at a smaller radial distance than the corresponding radial distance of bucket tips 31 from the axis of the machine so that only a portion of the flow discharge from buckets 18 is received into passageway 26.

A casing member 33 encloses the peripheral portion of rotor 17 and buckets 18 as well as a portion of the discharge face thereof. In addition, casing member 33 encloses the end portions of walls 27, 28 that are adjacent to the discharge side of buckets 18. Thus, it will be seen that casing 33 forms a substantially enclosed chamber for receiving the inefficient portions of the flow, that is portions of the motive fluid discharged by inefficient portions of nozzle passageway 24 and turbine buckets 18. The flow from passageway 24 and buckets 18 is indicated by arrows 34, 35, 36, and a plurality of openings 38 are provided in the rim portion of rotor 17 to provide a flow path from the root portion of passageway 24 into casing 33 as is indicated by arrow 37. A discharge opening 39 is provided in casing member 33 for discharging the fluid received therein to the atmosphere.

Thus it will be seen that only flow from the more efficient portions of passageway 24 is discharged into the flow path defined by buckets 18 and only flow from the more efficient portions of buckets 18 is discharged into exhaust passageway 26 so that the fluid discharged into passageway 26 is at the lowest possible temperature for the particular pressure ratio at which turbine 9 may be operating. Opening 39 may be left open to the atmosphere, or, if desired, it may be connected to a suitable conduit portion 40 for conveying the fluid in chamber 33 to a more convenient location in the aircraft before this fluid is discharged to the atmosphere. Discharge or exhaust passageway 26 is connected to conduit 7 (Fig. 1). Therefore, the air which is originally received from compressor 2 at relatively high temperature is ultimately delivered to cabin 4 at a desired pressure and at a considerably reduced temperature.

In order to provide greater flexibility and flow control, I provide a variable nozzle diaphragm 21 so that the minimum area of flow passageway 24 as well as the angle of vanes 25 with respect to turbine buckets 18 can be adjusted to an optimum value irrespective of the rate of flow of fluid through the turbine and the speed at which the turbine is operating. Referring now to Figs. 3 and 5, annular ring members 22, 23 differ from the usual annular member for nozzle diaphragms in that they are provided with a relatively large cross section, and the outer surface 41 of member 22 and the inner surface 42 of member 23 form concentric spherical surfaces. In order to provide structural strength and rigidity, a bridging structure comprising axially extending members 43—45 is secured to inner member 22 and outer member 23, respectively. Members 43, 44 are connected by a plurality of circumferentially spaced supporting members 45 extending substantially in a radial direction therebetween and connected thereto. The way in which members 22, 23 are connected together is intended merely to be illustrative, since many other ways will suggest themselves to those skilled in the art. For example, members 22, 23, 43, 44, 45 may be cast in one piece with all machining operations being performed subsequent to casting, or it may be desirable to rough machine the spherical surfaces 41, 42, on annular members 22, 23, respectively, and then fabricate the nozzle structure previously described, for example, by welding. In such case, it would probably be desirable to perform a finish machining operation subsequent to welding in order to insure accuracy of the dimensions of spherical surfaces 41, 42 and also to insure concentricity thereof.

The nozzle guide vanes 25 are also provided with spherical surfaces 30, 32, having substantially the same spherical radius as those of mating surfaces 41, 42, respectively. Annular members 22, 23 are each provided with a plurality of radially extending holes circumferentially spaced therein with a spacing corresponding to the number of nozzle vanes 25 to be employed. Each hole 46 receives a spindle 47 and each spindle 47 carries a nozzle vane 25.

It is important to note that the axes of holes 46 and spindles 47 pass through the same center from which spherical surfaces 41 and 42 are generated. It will now be apparent that such an arrangement permits limited rotation of nozzle vanes 25 relative to annular members 22, 23 without physical interference of parts, and at the same time the radii of spherical surfaces 30, 41 and 32, 42 can be made substantially alike so that there will be no excessive tendency for the fluid to leak past the clearance spaces formed between blade surfaces 30, 32 and spherical surfaces 41, 42, respectively, instead of passing through the passages defined between adjacent blades 25.

Thus it will be seen that each of the respective blades 25 is rotatably supported with respect to annular members 22, 23 and is, therefore, free to rotate relative thereto. The radially extending spindles 47 project entirely through outer member 23 to permit connection to an operating means for rotating each nozzle vane 25 uniformly relative to ring members 22, 23. A crank member 48 is rigidly secured to each spindle 47 by a pin 48a so that any rotational movements imparted to crank member 28 will be transferred to the corresponding vane 25. One such crank member is illustrated in Figs. 3 and 4 of the drawings. Crank members 48 are pivotally connected to a ring member 49 in a manner which will be obvious by reference to Figs. 3 and 4. Ring member 49 is rotatably supported relative to nozzle box 19 and nozzle diaphragm 21 by a bracket member 50 secured to annular member 23 by threaded fastening 51 and a rotatable member 52 carried by the opposite end of bracket member 50. Rotatable member 52 is formed somewhat like a pulley with a grooved portion 53 for receiving and guiding ring member 49. The periphery, or at least portions of the periphery, of ring member 49 is provided with a plurality of gear teeth 54 which mesh with a pinion 55. Pinion 55 is connected to a shaft 56 which is rotatably supported by a suitable bracket 57. Bracket 57 is connected to and supported by annular ring 23 or any other convenient member that is stationary with respect to nozzle diaphragm 21. Shaft 56 is connected to an operator's control (not shown) so that angular adjustment of nozzle vanes 25 can be effected by rotational movements imparted to shaft 56.

If the operator desires to effect a change in the angularity of vanes 25 relative to annular members 22, 23, he merely imparts a rotational motion to shaft 56 thereby causing pinion 55 to rotate. Since the teeth of pinion 55 are continually held in mesh with the teeth 54 provided on ring member 49, it will be apparent that ring 49 will be caused to rotate on the mount which is proportional to the amount of rotation imparted to shaft 56. This rotational movement of annular ring 49 is likewise proportionally transmitted to nozzle vanes 25, since crank member 48 is caused to pivot about the axis of spindles 47 thus causing vanes 25 to rotate an amount proportional to the degree of rotation of ring member 49, as will be apparent by an inspection of Fig. 4.

While a single embodiment of the invention has been illustrated and described, it will be obvious to those skilled in the art that various changes and modifications may be made without departing from the invention and it is intended to cover in the appended claims all such changes and modifications that come within the true spirit and scope of the invention.

What I claim as new and desire to secure by Letters Patent of the United States is:

1. In an elastic fluid turbine, the combination comprising nozzle means forming an annular fluid passage, a rotor carrying a row of buckets adjacent to and at the downstream side of the nozzle means, and walls defining an annular exhaust passage having an end portion adjacent to and at the downstream side of said row of buckets, said nozzle means and said row of buckets and said bucket row and said end portion being disposed respectively in negative overlap relation.

2. In a refrigeration turbine, the combination comprising annular variable nozzle means, a rotor carrying a plurality of buckets adjacent to and at the downstream side of said nozzle means, said nozzle means and said buckets being disposed in negative overlap relation, first walls defining an anular exhaust passage having an end portion adjacent to said buckets and disposed in negative overlap relation therewith, and a second wall enclosing said buckets and the first walls to define an annular fluid passage and also defining an opening therein in communication with the atmosphere.

3. In a refrigeration turbine, the combination comprising annular variable nozzle means, a rotor carrying a plurality of buckets adjacent to and at the downstream side of said nozzle means, said nozzle means and said buckets being disposed in negative overlap relation, first walls defining an annular exhaust passage having an end portion adjacent to said buckets and disposed in negative overlap relation therewith, second walls enclosing said buckets and the first walls to define an annular fluid passage having an opening therein in communication with the atmosphere, and a fluid passageway in said rotor to establish communication between the upstream side of the rotor and the annular fluid passage.

4. In a refrigeration turbine, the combination comprising variable nozzle means including inner and outer radially spaced annular members having outer and inner concentric spherical surfaces, respectively, defining a fluid passageway and a plurality of circumferentially spaced vane members secured to radially extending spindles having an axis passing through the center of said spherical surfaces and rotatably supported by at least one of said annular members, a rotor carrying a plurality of buckets adjacent to and at the downstream side of said nozzle means, said nozzle means and said buckets being disposed in negative overlap relation, and inner and outer walls defining an annular exhaust passage having an end portion adjacent to and disposed in negative overlap relation therewith.

5. In an elastic fluid turbine, the combination comprising variable nozzle means including inner and outer annular members having spaced outer and inner concentric spherical surfaces, respectively, defining a fluid passageway and a plurality of spaced vane members extending between said spherical surfaces and rotatably supported by at least one of said annular members, a rotor carrying a row of buckets spaced from said vane members, and walls defining an exhaust passage having an end portion spaced from said row of buckets and from said vane members, said nozzle means and said row of buckets and said passage end portion being disposed respectively in negative overlap relation.

6. Apparatus in accordance with claim 5, including means for rotating all of said vane members simultaneously relative to said ring members.

DAVID J. BLOOMBERG.

References Cited in the file of this patent

UNITED STATES PATENTS

| Number | Name | Date |
| --- | --- | --- |
| 1,440,000 | Bonine | Dec. 26, 1922 |
| 1,944,520 | Meyer | Jan. 23, 1934 |
| 2,367,223 | Larrecq | Jan. 16, 1945 |
| 2,412,365 | Sollinger | Dec. 10, 1946 |
| 2,494,328 | Bloomberg | Jan. 10, 1950 |
| 2,497,041 | Bodger | Feb. 7, 1950 |
| 2,527,845 | Peterson | Oct. 31, 1950 |
| 2,581,964 | Mayer | Jan. 8, 1952 |